US010990984B2

(12) United States Patent
Ekambaram et al.

(10) Patent No.: US 10,990,984 B2
(45) Date of Patent: *Apr. 27, 2021

(54) ASSESSING PENALTIES FOR SDKS THAT VIOLATE POLICIES IN MOBILE APPS

(71) Applicant: International Business Machines Corporation, Armonk, NY (US)

(72) Inventors: Vijay Ekambaram, Chennai (IN); Saravanan Sadacharam, Chennai (IN); Vijay Kumar Ananthapur Bache, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 146 days.

This patent is subject to a terminal disclaimer.

(21) Appl. No.: 16/124,656

(22) Filed: Sep. 7, 2018

(65) Prior Publication Data
US 2019/0005509 A1    Jan. 3, 2019

Related U.S. Application Data

(63) Continuation of application No. 15/209,836, filed on Jul. 14, 2016, now Pat. No. 10,163,112.

(51) Int. Cl.
*G06Q 30/00*     (2012.01)
*G06F 8/77*      (2018.01)
(Continued)

(52) U.S. Cl.
CPC .............. *G06Q 30/018* (2013.01); *G06F 8/71* (2013.01); *G06F 8/77* (2013.01); *G06F 9/45504* (2013.01); *G06Q 30/04* (2013.01)

(58) Field of Classification Search
CPC ........ G06Q 30/018; G06Q 30/04; G06F 8/71; G06F 9/45504; G06F 8/77
(Continued)

(56) References Cited

U.S. PATENT DOCUMENTS 8,763,071 B2    6/2014  Sinha et al.
2007/0185984 A1  8/2007  Roth
(Continued)

OTHER PUBLICATIONS

AT&T; "Developers, is your app slow and unresponsive? Speed it up with AT&T ARO"; AT&T Application Resource Optimizer; AT&T Developer Program; Copyright 2016 AT&T Intellectual Property; Printed Jul. 13, 2016; pp. 2; (https://developer.att.com/application-resource-optimizer>.

(Continued)

*Primary Examiner* — Russell S Glass
(74) *Attorney, Agent, or Firm* — Robert J. Shatto

(57) ABSTRACT

A system, method and program product for processing software development kits (SDKs). A system is provided that includes a container creation system that wraps an inputted SDK in a penalty container to create a wrapped SDK, wherein the wrapped SDK includes re-instrumented code that redirects application programming interface (API) calls between the SDK and an associated App and operating system through a wrapper in order to monitor runtime behavior; wherein the container creation system instantiates a policy module that is configurable by an SDK provider and App developer to implement a mutual policy configuration for the penalty container; and wherein the penalty container includes a penalty manager notifies the SDK provider and App developer of SDK violations of the mutual policy configuration.

20 Claims, 3 Drawing Sheets

(51) Int. Cl.
*G06Q 30/04* (2012.01)
*G06F 9/455* (2018.01)
*G06F 8/71* (2018.01)

(58) Field of Classification Search
USPC .......................................................... 705/34
See application file for complete search history.

(56) References Cited

U.S. PATENT DOCUMENTS

| | | |
|---|---|---|
| 2011/0145593 A1* | 6/2011 | Auradkar ................ H04L 9/006 |
| | | 713/189 |
| 2012/0036498 A1 | 2/2012 | Akirekadu et al. |
| 2012/0233589 A1 | 9/2012 | Mruthyunjaya et al. |
| 2013/0097706 A1 | 4/2013 | Titonis et al. |
| 2014/0215614 A1 | 7/2014 | Beskrovny et al. |
| 2014/0258986 A1 | 9/2014 | Wang et al. |

OTHER PUBLICATIONS

"Little Eye helps build better Android Apps"; little eye labs; Performance Analysis and Monitoring Tools for Android Developers—Little Eye Labs; Copyright 2014 Liberty Acquisition Sub II, LLC; Printed Jul. 13, 2016; pp. 6; <http://www.littleeye.co/>.
Moriarty, Joe; "What is App Wrapping"; Content Raven Content Security; Jun. 11, 2013; 2013.
Ekambaram, Vijay; Notice of Allowance and Fee(s) Due dated Aug. 24, 2018 for U.S. Appl. No. 15/209,836, filed Jul. 14, 2016; pp. 12.

\* cited by examiner

ASSESSING PENALTIES FOR SDKS THAT VIOLATE POLICIES IN MOBILE APPS

TECHNICAL FIELD

The subject matter of this invention relates the processing of software developer kits (SDKs), and more particularly to a system and method of assessing penalties to SDK providers for performance failures.

BACKGROUND

The use of software developer kits (SDKs) by developers of mobile applications (Apps) remains an effective mechanism for providing a rapid development process. Rather than recreate some specialized functionality, App developers can simply obtain and incorporate an SDK from a third party for integration into an App they are developing. SDKs may for example provide an advertising platform, user analytics, push notifications, content management, etc.

Because mobile Apps must adhere to security principles such as Mobile Inter Process Communications (IPC), e.g., an App cannot control the behavior of other Apps. However, because an SDK must be packaged as part of an App, the SDK may have significant control over various operations associated with the App. One problem that arises in this context is that when runtime errors or performance degradation occur, it is generally not evident if the App itself is responsible or the SDK is responsible.

The impact of such SDK problems to App developers may be significant. For instance, users who come across errors might write a negative comment about the App, stop using the App, or find a more reliable App, even though the fault belongs to the SDK and not the App developer.

Furthermore, for many SDKs, developers are required to pay licensing fees that can be costly. As such, App developers tend to favor well-known SDKs that are considered trustworthy and bug free. Consequently, newer SDKs have difficulty in earning trust within the App developer community, as App developers are unwilling to consider using untrusted SDKs that might introduce runtime issues into their App.

SUMMARY

Aspects of the disclosure provide for the implementation of penalty containers that encapsulate SDKs and monitor agreed performance, security and privacy policies, and assess penalties to an SDK provider when a violation occurs.

A first aspect provides a software development kit (SDK) processing system, comprising: a container creation system that wraps an inputted SDK in a penalty container to create a wrapped SDK, wherein the wrapped SDK includes re-instrumented code that redirects application programming interface (API) calls between the SDK and an associated App and operating system through a wrapper in order to monitor runtime behavior; wherein the container creation system instantiates a policy module that is configurable by an SDK provider and App developer to implement a mutual policy configuration for the penalty container; and wherein the penalty container includes a penalty manager that assesses penalties to the SDK provider based on SDK violations of the mutual policy configuration.

A second aspect provides a computer program product stored on a computer readable storage medium, which when executed by a computing system, processes software development kits (SDKs), the program product comprising: program code that wraps an inputted SDK in a penalty container to create a wrapped SDK, wherein the wrapped SDK includes re-instrumented code that redirects application programming interface (API) calls between the SDK and an associated App and operating system through a wrapper in order to monitor runtime behavior; and program code that instantiates a policy module that is configurable by an SDK provider and App developer to implement a mutual policy configuration for the penalty container; wherein the penalty container includes program code that assesses penalties to the SDK provider based on SDK violations of the mutual policy configuration.

A third aspect provides a computerized method for processing software development kits (SDKs), comprising: receiving an SDK from an SDK provider; wrapping the SDK in a penalty container to create a wrapped SDK, wherein the wrapped SDK includes re-instrumented code that redirects application programming interface (API) calls between the SDK and an associated App and operating system through a wrapper in order to monitor runtime behavior; and instantiating a policy module that is configurable by the SDK provider and an App developer to implement a mutual policy configuration for the penalty container; wherein the penalty container includes a penalty manager that assesses penalties to the SDK provider based on SDK violations of the mutual policy configuration.

BRIEF DESCRIPTION OF THE DRAWINGS

These and other features of this invention will be more readily understood from the following detailed description of the various aspects of the invention taken in conjunction with the accompanying drawings in which.

Figure 1:
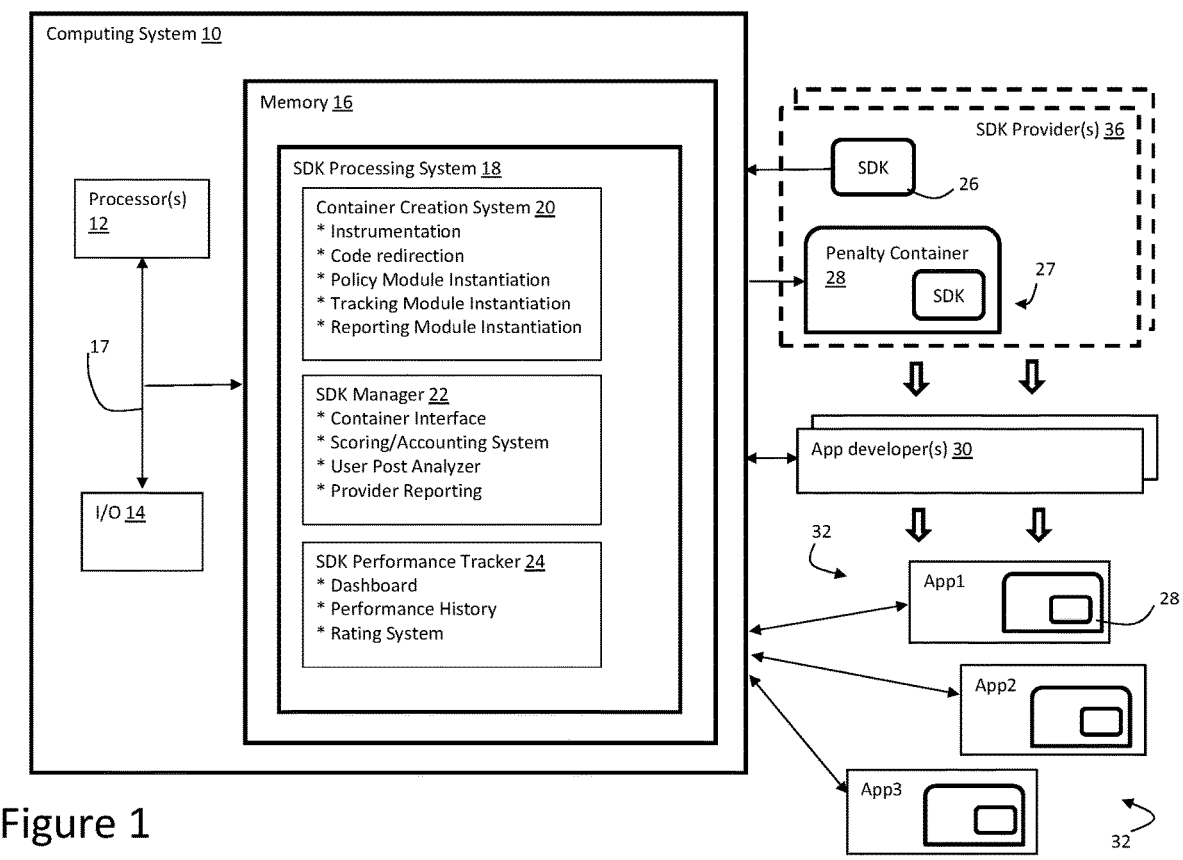
FIG. 1 shows a computing system having an SDK processing system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a computing system 10 having a software development kit (SDK) processing system 18 that processes SDKs 26 being made available by SDK providers 36 to App developers 30 for inclusion into deployed Apps 32. SDK processing system 18 re-instruments SDKs to self-monitor performance issues introduced by SDKs 26 in deployed Apps 32.

To achieve this, SDK processing system 18 includes a container creation system 20 that inputs an SDK 26 from an SDK provider 36 and wraps the SDK 26 in a penalty container 28 to create a wrapped SDK 27. The wrapped SDK 27 provides a more robust SDK that can be utilized and trusted by App developers 30, versus the original SDK 26. Container creation system 20 may for example utilize ASM byte code translation or a method reflection technique to automate the process of wrapping the SDK 26 in the penalty container 28. One aspect of this process re-instruments code in the SDK 26 such that all API (application programming interface) calls involving the SDK 26 are redirected through the penalty container APIs rather than directly calling the App or operating system (OS) APIs.

Figure 2:
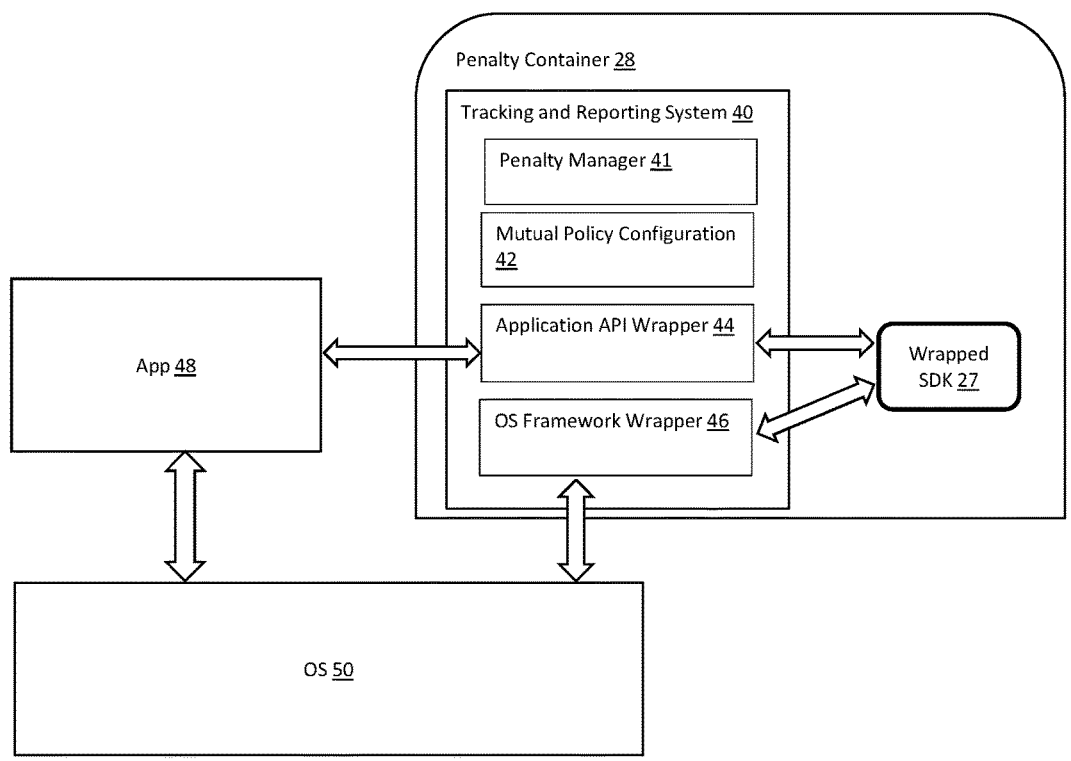
FIG. 2 shows a penalty container according to embodiments.

A more detailed example of an implemented penalty container 28 is shown in FIG. 2. As shown, penalty container 28 includes a tracking and reporting system 40 that monitors runtime interactions between wrapped SDK 27 and its associated App 48 and OS 50. As can be seen, interactions between wrapped SDK 27 and App 48 are passed through application API wrapper 44, and interactions between SDK 26 and OS 50 pass through OS framework wrapper 46. For example, if SDK 26 has to use Execute( ) of Activity manager class (OS Class), it would be instrumented to call Execute( ) of Activity manager Wrapper class (i.e., Middleware class) which in turn calls the Execute( ) of Activity manager class. In a further example, a wrapped SDK command for get_version( ) to the App 48 may be re-instrumented to get_container_version( ). The get_container_version( ) would be passed through the Application API wrapper 44, which would in turn call get_version( ). The response from App 48 would likewise pass through Application API wrapper 44 before being forwarded to the wrapped SDK 27.

Referring to FIGS. 1 and 2, container creation system 20 also instantiates a policy module for the penalty container 28, which can be configured by the SDK provider 36 and App developer 30 to implement a mutual policy configuration 42. The agreed upon mutual policy configuration 42 may for example include: (1) a securities policy; (2) a performance policy; and (3) a permissions policy. Based on the mutual policy configuration 42, APIs in the penalty container 28 are configured to monitor specified runtime behaviors against the policies.

The securities policy may for example dictate the type of data the wrapped SDK 27 can share outside of the App 40. For example, all the data that is used by the App 48 is stored in its "sandbox" within the App context, and SDKs 26 have equal access to the data that is stored by App 48, e.g., image data, Javascript Object Notation (JSON) data, etc. Third party SDKs 26 can easily access this file system/sandbox and make use of the data or corrupt the data, as the SDK 26 always uses the App context. It is very difficult to control this, unless the SDK source code is scanned. Thus, SDK 26 could retrieve all the sandbox data and share it on the Internet, which is very risky, especially when the data that is stored on the sandbox is not encrypted. Accordingly, the securities policy may limit the sharing of data for wrapped SDKs 27.

Performance policies may for example track and limit utilization of the CPU and/or memory. SDK code is loaded along with the App code, and uses the same process space. There could be bad code in the wrapped SDK 27, which might impact the overall App performance. When an App developer buys/utilizes the wrapped SDK 27, the parties can agree on the performance that is expected from wrapped SDK 27, e.g., memory usage should remain below 1 Mb, or there should never be a reduction in CPU performance below a predefined threshold.

Permission policies may for example set limits on the resources available to the wrapped SDK 27. For example, when an App 48 is installed/launched, the App 48 typically requests access to resources, and an alert is provided to the user, for the user's agreement to use these resources. The wrapped SDK 27 that is used in the App 48 also gets the same access to these resources, and it is possible to misuse these resources and, e.g., collect data that could confidential, use the GPS continuously to drain a battery, etc.

The mutual policy configuration 42 may be created manually or in an automated fashion from a policy module instantiated by the container creation system 20. In one approach, the App developer 30 can be presented with the instantiated policy module when they license a wrapped SDK 27 from SDK provider 36 that allows the App developer 30 to specify policy requirements (e.g., with checked boxes, etc.). Additional policies not described herein, e.g., behavioral policies, location policies, user policies, etc., could likewise be implemented.

During runtime, the tracking and reporting system 40 continuously monitors code/control flow against the mutual policy configuration 42, and ensures that policies are being adhered to. An SDK profile can then be derived (e.g., based on normal CPU and memory usage requirements, available resources, etc.), and whenever an outlier is detected (e.g., CPU usage is exceeded, a restricted resource is being utilized, etc.), an SDK violation can be raised by penalty manager 41. The penalty manager 41 will analyze the degree of deviation relative to the mutual policy configuration 42 and calculate a penalty score. The penalty manger 41 could be in implemented in whole or in part within the penalty container 28 and/or on a separate computing system, e.g., within SDK manager 22 as shown in FIG. 1. In particular, SDK manager 22 may provide a container interface to communicate with all deployed penalty containers 28 to receive penalty and or SDK violation information.

Penalties may also be assessed if a user posts a negative comment that results from an SDK violation. For example, if the App 48 does not load properly due to a blocking call in the wrapped SDK, and the user posts a negative comment in a review store on the Internet, a high penalty score may be assessed. The identification of the negative review may be determined by the SDK manager 22, which may regularly scan known review stores.

Regardless of how the penalties are assessed, SDK manager 22 oversees the assessment of penalties to SDK providers 36. In one illustrative embodiment, the SDK manager 22 will trigger email notifications to the SDK providers 36 and App developers 30 with log details that provide proof of a violation. The SDK providers 36 will be charged a penalty (e.g., a monetary amount) that for example can be credited to the App developer. The amount of the penalty may for example be small, e.g., 0.01 US dollars, that is deducted or debited from the SDK providers account and credited into the App developers account. In this embodiment, SDK manager 22 may be provided with access to actual bank accounts, or may simply keep track of balances for the SDK providers 36 and App developers 30.

As shown in FIG. 1, an SDK performance tracker 24 may be implemented to track and rate the performance of all wrapped SDKs 27 that have been deployed with the SDK processing system 18. Accordingly, wrapped SDKs 27 that have few reported violations over time may be ranked as highly trusted relative to those wrapped SDKs 27 that are regularly violating policies.

Figure 3:
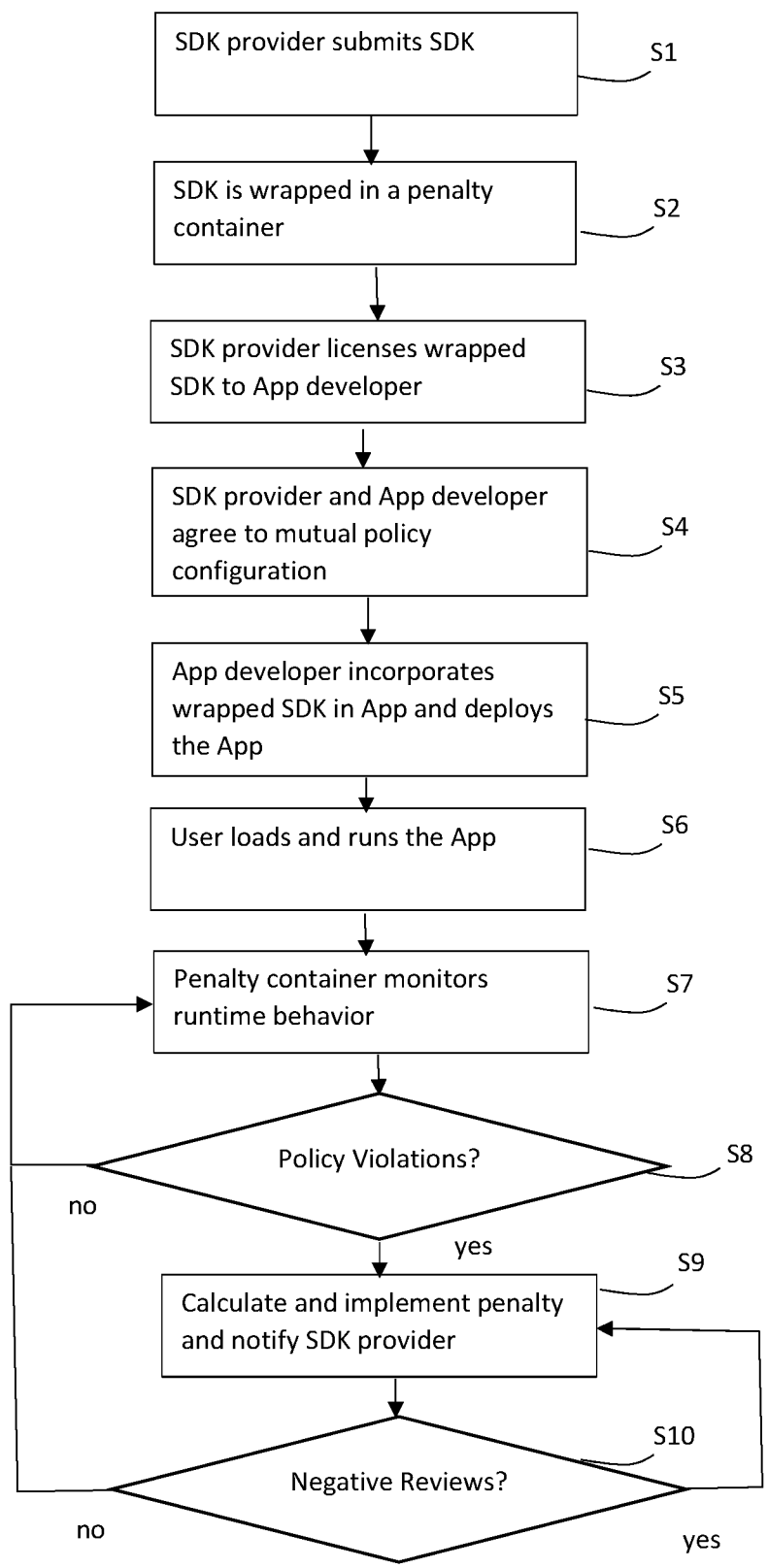
FIG. 3 shows a flow diagram of implementing an SDK processing system according to embodiments.

FIG. 3 depicts a flow diagram of an illustrative SDK processing system 18 implementation. At S1, an SDK provider 36 submits an SDK 26 to the SDK processing system 18, and at S2, the SDK 26 is wrapped in a penalty container 28. At S3, the SDK provider 36 licenses the wrapped SDK 27 to an App developer 30 and at S4 the SDK provider 36 and App developer 30 agree to a mutual policy configuration. Next, the App developer 30 incorporates the wrapped SDK 27 into an App and the App is deployed at S5. At S6, users load and run the App, and at S7 the penalty container 28 monitors runtime activity. At S8, a determination is made whether any policy violations have occurred. If no, the monitoring at S7 continues. If yes, a penalty is calculated and implemented for the violation, and the SDK provider 36 is notified at S9. At S10, a determination is made whether any negative reviews were posted as a result of the violation. If no, the monitoring at S7 continues. If yes, a further penalty is calculated and implemented for the violation, and the SDK provider 36 is notified at S9.

It is understood that SDK processing system 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 16, an input/output (I/O) 14 (e.g., one or more I/O interfaces and/or devices), and a communications pathway 17. In general, processor(s) 12 execute program code which is at least partially fixed in memory 16. While executing program code, processor(s) 12 can process data, which can result in reading and/or writing transformed data from/to memory and/or I/O 14 for further processing. The pathway 17 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the SDK processing system 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A software development kit (SDK) processing system, comprising:
    a container creation system that wraps an inputted SDK in a penalty container to create a wrapped SDK, wherein the wrapped SDK includes re-instrumented code that redirects application programming interface (API) calls between the SDK and an associated App and operating system through a wrapper in order to monitor runtime behavior;
    wherein the container creation system instantiates a policy module that is configurable by an SDK provider and App developer to implement a mutual policy configuration for the penalty container; and
    wherein the penalty container includes a penalty manager that notifies the SDK provider and App developer of an SDK violation of the mutual policy configuration.

2. The SDK processing system of claim 1, wherein the mutual policy configuration includes a security policy, a performance policy and a behavior policy.

3. The SDK processing system of claim 1, wherein the penalty manager assesses a monetary penalty to the SDK provider.

4. The SDK processing system of claim 1, further comprising an SDK manager that interfaces with deployed penalty containers.

5. The SDK processing system of claim 4, wherein the SDK manager scans for negative posts by users resulting from SDK violations.

6. The SDK processing system of claim 4, wherein the SDK manager notifies SDK providers of SDK violations and a penalty amount.

7. The SDK processing system of claim 6, wherein the SDK manager provides an accounting system that debits an SDK provider and credits an App developer an assessed penalty amount when an SDK violation occurs.

8. A computer program product stored on a computer readable storage medium, which when executed by a computing system, processes software development kits (SDKs), the program product comprising:
    program code that wraps an inputted SDK in a penalty container to create a wrapped SDK, wherein the wrapped SDK includes re-instrumented code that redirects application programming interface (API) calls between the SDK and an associated App and operating system through a wrapper in order to monitor runtime behavior; and
    program code that instantiates a policy module that is configurable by an SDK provider and App developer to implement a mutual policy configuration for the penalty container;
    wherein the penalty container includes program code that notifies that SDK provider and App developer of SDK violations of the mutual policy configuration.

9. The program product of claim 8, wherein the mutual policy configuration includes a security policy, a performance policy and a behavior policy.

10. The program product of claim 8, wherein the penalty container includes an assessed monetary penalty.

11. The program product of claim 8, further comprising program code that interfaces with deployed penalty containers.

12. The program product of claim 11, further comprising program code that scans for negative posts by users resulting from SDK violations.

13. The program product of claim 11, further comprising program code that notifies SDK providers of SDK violations and a penalty amount.

14. The program product of claim 13, further comprising program code that debits an SDK provider and credits an App developer an assessed penalty amount when an SDK violation occurs.

15. A computerized method for processing software development kits (SDKs), comprising:
    receiving an SDK from an SDK provider;
    wrapping the SDK in a penalty container to create a wrapped SDK, wherein the wrapped SDK includes re-instrumented code that redirects application programming interface (API) calls between the SDK and an associated App and operating system through a wrapper in order to monitor runtime behavior; and
    instantiating a policy module that is configurable by the SDK provider and an App developer to implement a mutual policy configuration for the penalty container;
    wherein the penalty container includes a penalty manager that notifies an SDK provider and App developer of an SDK violation of the mutual policy configuration.

16. The computerized method of claim 15, wherein the mutual policy configuration includes a security policy, a performance policy and a behavior policy.

17. The computerized method of claim 15, wherein a monetary penalty is assessed to the SDK developer.

18. The computerized method of claim 15, further comprising:
   interfacing with deployed penalty containers.

19. The computerized method of claim 15, further comprising:
   scanning for negative posts by users resulting from SDK violations.

20. The computerized method of claim 15, further comprising:
   notifying SDK providers of SDK violations and a penalty amount.

\* \* \* \* \*